Aug. 14, 1928.
F. G. EISENHUTH
1,680,974
WHEEL PULLER
Filed Sept. 2, 1927
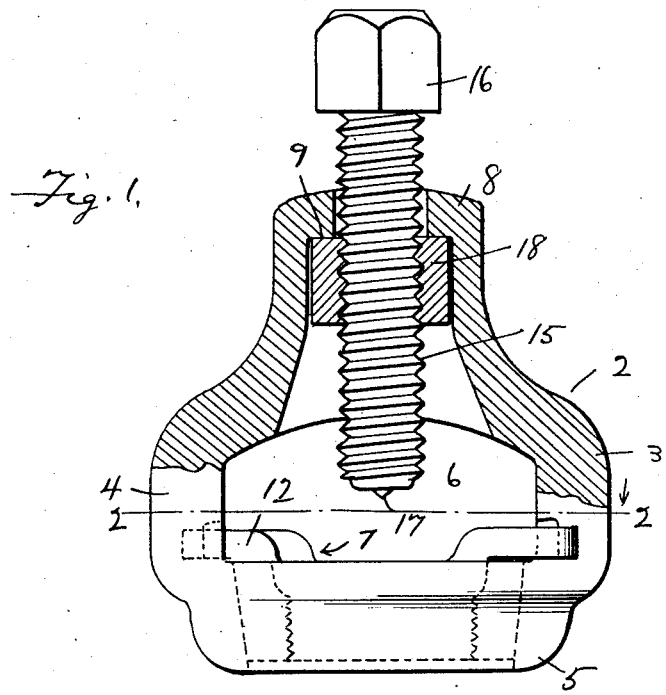
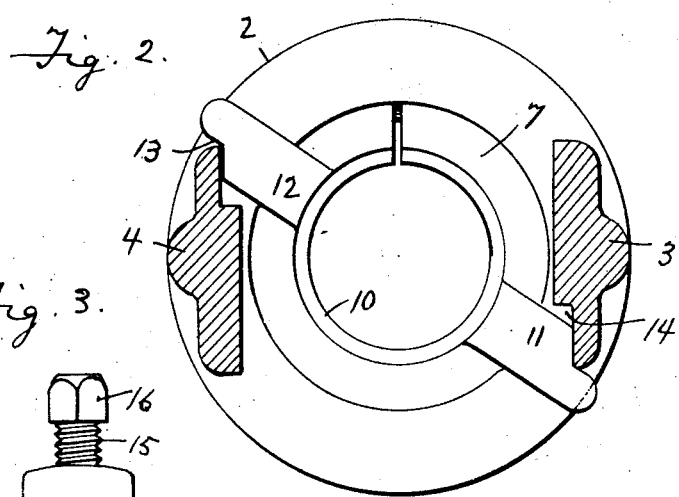
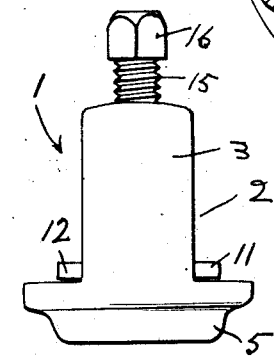
Inventor
Frederick G. Eisenhuth
By Clarence A. O'Brien
Attorney Patented Aug. 14, 1928.

1,680,974

UNITED STATES PATENT OFFICE.

FREDERICK GEORGE EISENHUTH, OF UTICA, NEW YORK.

WHEEL PULLER.

Application filed September 2, 1927. Serial No. 217,198.

The present invention relates to improvements for devices for pulling off automobile wheels from their axles and has for its principal object to provide a device which is simple in construction, yet positive and efficient in its operation.

One of the important objects of the present invention is to provide an automobile wheel puller wherein the same includes a hollow body formed with a tapered annular seat for removably receiving a split bushing which is internally threaded for engagement on the threaded hub of the wheel which is to be removed, the outer peripheral face of the split bushing being tapered to cooperate with the tapered seat whereby said split bushing will be securely clamped on the hub when the pressure screw is forced inwardly when in engagement with the outer end of the axle.

A further object is to provide a wheel puller of the above mentioned character which will accommodate split bushings having different inner diameters whereby only one body and pressure screw is necessary to permit the puller to be used on wheels of different sizes, the split bushing being readily removable or insertable with respect to the body.

A further object of the invention is to provide a wheel puller wherein cooperating means is provided between the body portion and the split bushing for limiting the rotation of the body portion with respect to the split bushing in one direction.

A still further object is to provide a wheel puller of the above mentioned character which is inexpensive, strong and durable and furthermore well adapted for the purposes for which it is designed.

Other objects and advantages of the invention will become apparent from the following description taken in connection with the accompanying drawing.

In the accompanying drawing wherein like reference characters indicate corresponding parts:

Figure 1 is a view partly in elevation and partly in section of the wheel puller embodying my invention.

Figure 2 is a sectional view taken substantially upon the line 2—2 of Figure 1 looking in the direction of the arrows, and Figure 3 is a side elevation of the wheel puller, drawn on a reduced scale.

In the drawing wherein for the purpose of illustration is shown the preferred embodiment of my invention, the numeral 1 designates generally the wheel puller, the same comprising the body 2 which is cast in a single piece of steel or malleable iron. This body is hollow and the sides thereof are cut away to provide a pair of diametrically opposed arms 3 and 4, respectively, the purpose of which will be presently apparent. A ring-like seat 5 is formed on the bottom portion of the body 2 and the inner peripheral face of this seat is tapered in the manner as is more clearly disclosed in Figure 1 for a purpose also to be presently described.

The interior portion of the body 2 directly above the seat 5 is enlarged as indicated at 6 to provide a space large enough to facilitate the insertion and removal of the bushing 7, the construction of which will be hereinafter more fully described. The bore of the hollow body 2 gradually decreases toward the upper end of the body and an inwardly directed annular flange 8 is formed on the upper end of the body for the purpose of forming the shoulder 9 in the bore of the body at the upper end portion thereof.

The bushing 7 comprises a split ring which is internally threaded as indicated at 10 to permit the same to engage over the threaded end of the hub of the wheel which is to be removed and the outer peripheral face of this split bushing is tapered for cooperation with the internally tapered annular seat 5.

A pair of diametrically opposed lugs 11 and 12, respectively, are formed on the upper face of the split bushing 7 and extend laterally therefrom outwardly of the bushing. The outer end of each lug is cut away as indicated at 13 with reference more particularly to Figure 2 and the inner diagonally opposed edge portions of the arms 3 and 4 are also cut out as illustrated at 14 for cooperation with the cut out portions 13 of the lugs 11 and 12, respectively. These lugs cooperate with the arms 3 and 4 when the split bushing is positioned in the annular seat 5 to limit the rotation of the body with respect to the bushing in one direction.

The bushing 7 is of such size as to permit the same to be readily removed or inserted within the seat 5 through the enlarged opening 6, and this construction provides a means whereby split bushings of different inner diameters may be employed to accommodate various sizes of hubs, thus obviating the necessity of having to provide a separate and complete wheel puller for each size hub. The body 2 can be used with any number of removable split bushings and the parts are so arranged as to enable the bushing to be quickly and easily inserted or removed.

Also forming an important part of the present invention is the pressure screw 15 which is formed at its upper end with a tool engaging head 16 and this screw extends downwardly through the upper end of the hollow body and the pointed end 17 will pass centrally through the bushing 7 and will engage the outer end of the axle on which the wheel which is to be removed is mounted.

A floating nut 18 is arranged within the reduced upper end portion of the bore of the hollow body and the pressure screw is threaded through this nut in the manner clearly shown in Figure 1. The upper face of the nut is adapted to engage the shoulder 9 formed by the inwardly directed flange 8, and this is also shown very clearly in Figure 1 of the drawing.

In use, the parts are arranged as shown in Figure 1 with the proper size split bushing seated within the ring-like seat 5. The bushing is then threaded onto the outer threaded end of the hub of the wheel which is to be removed and the head 16 of the pressure screw is rotated so as to move the screw inwardly and as the inner pointed end of the screw is in engagement with the outer end of the axle, and further pressure is applied, the body portion 2 will have a tendency to move outwardly, and the tapered inner face of the seat 5 will cooperate with the tapered outer face of the split bushing to compress the same and tightly secure the bushing on the hub, thus permitting the wheel to be readily and easily moved from the axle.

The simplicity of my device enables the same to be readily and easily assembled for use, and will at all times be positive and efficient in carrying out the purposes for which it is designed. Furthermore, the single body member can be used with various sizes of split bushings, thus saving considerable expense and providing a means whereby the wheel puller can be employed with wheels having different sizes of hubs.

While I have shown the preferred embodiment of my invention, it is to be understood that minor changes in the size, shape, and arrangement of parts may be resorted to without departing from the spirit of the invention or the scope of the appended claim.

Having thus described the invention, what I claim is:—

In a wheel puller, a hollow body, the same being formed with a downwardly tapering enlarged annular seat on the open lower end portion of the body, the upper end of the body being reduced, an internally threaded split bushing for disposition within the annular seat, the outer peripheral face of the bushing being tapered for cooperation with the tapered seat, said bushing being adapted to be threaded on the wheel hub, a pressure screw extending downwardly through the reduced upper end of the body, the lower end of the screw adapted to engage the outer end of the wheel axle, a nut arranged in the reduced upper end portion of the body through which the pressure screw is threaded, cooperating means between the bushing and the body for limiting the rotary movement of the members with respect to each other in one direction, said means comprising a pair of diametrically opposed lugs extending laterally from the upper edge portion of the bushing, said hollow body being formed with projections with which the lugs cooperate.

In testimony whereof I affix my signature.

FREDERICK GEORGE EISENHUTH.